United States Patent

Hawks

[15] 3,676,750

[45] July 11, 1972

[54] DATA INPUT DEVICE WITH HAND-HELD SELECTIVE CIRCUIT CLOSING MEANS

[72] Inventor: John D. Hawks, Lynchburg, Va.

[73] Assignee: General Electric Company

[22] Filed: Sept. 15, 1970

[21] Appl. No.: 72,343

[52] U.S. Cl. ....................... 317/112, 200/61.59, 339/221 M

[51] Int. Cl. ....................... H01r 9/08

[58] Field of Search ................ 250/220 M; 317/99, 112, 118; 200/522, 61.59; 338/77; 339/48, 221 M

[56] References Cited

UNITED STATES PATENTS

| | | | |
|---|---|---|---|
| 2,967,285 | 1/1961 | Freitas | 339/221 M |
| 3,175,179 | 3/1965 | Trump | 317/112 X |
| 3,191,040 | 6/1965 | Critchlow | 250/220 M |
| 2,924,321 | 2/1960 | Ziskind | 250/220 M |
| 2,475,237 | 7/1949 | Gordon | 200/52 L |
| 3,308,253 | 3/1967 | Krakinowski | 200/46 |

*Primary Examiner*—Lewis H. Myers
*Assistant Examiner*—Gerald P. Tolin
*Attorney*—James J. Williams, Frank L. Neuhauser, Oscar B. Waddell and Joseph B. Forman

[57] ABSTRACT

A personal data input device has a base plate with contacts, each of which represents a selected character, and a face plate positioned above the base plate. The face plate has an opening adjacent each contact so that a hand-held stylus can be inserted through a selected opening to engage or operate the corresponding contact, and thereby receive data which operates an encoder. The stylus can either close an electrical circuit to the selected contact by engagement, or can operate the contact by motion or other means.

1 Claim, 3 Drawing Figures

INVENTOR:
JOHN D. HAWKS,

BY James J. Williams
HIS ATTORNEY.

DATA INPUT DEVICE WITH HAND-HELD SELECTIVE CIRCUIT CLOSING MEANS

BACKGROUND OF THE INVENTION

My invention relates to a data input or receiving device, and particularly to a data input or receiving device that is relatively small and light, and that can be held in a person's hand.

Encoders are frequently used to convert data signals to coded signals that represent the data signals. For example, the keyboard of a teletypewriter produces data signals which the encoder converts to coded signals, such as various sequences of alternating current signals for example, in order that the signals can be stored in a recording or storage device, or can be transmitted over a communication channel such as a telephone line or radio link. For many types of communication channels, the encoder is essential. One example of a communication channel requiring an encoder is the mobile radio for a police patrol car which must handle data, such as automobile license numbers for example. In such an example, the encoder may be mounted in the trunk along with the transmitter and receiver. However, there is still the necessity for providing data signals to the encoder. In the example of the police patrol car, the data signals have been provided by a keyboard which is operated by the automobile driver or an assistant. Generally, the space available for a keyboard in such a case is limited, so that a need exists for some sort of relatively small and light personal device for receiving data and operating an encoder.

Accordingly, a principal object of my invention is to provide a new and improved data input or data receiving device.

Another object of my invention is to provide a new device for receiving data and operating an encoder, the data receiving device being relatively small in size and light in weight so that the device can be conveniently stored and quickly used when needed.

SUMMARY OF THE INVENTION

Briefly, these and other objects are achieved in accordance with my invention by a data input or receiving device which has a small, preferably hand-sized, base plate. The base plate is provided with a plurality of electrical contacts fixed thereto, each of which represents a desired character of data to be received. The contacts are adapted to be connected by a cable to an encoder. A face plate is positioned above the base plate, and is provided with a plurality of openings, there being one opening adjacent to and corresponding with each contact. A hand-held stylus, shaped to pass through the openings, is provided to engage each contact, and thus provide for the receipt of data to operate an encoder. The stylus can be arranged to close an electrical circuit to the selected contact, or can be arranged to operate the contact by motion or other means.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENTS

Figure 1:
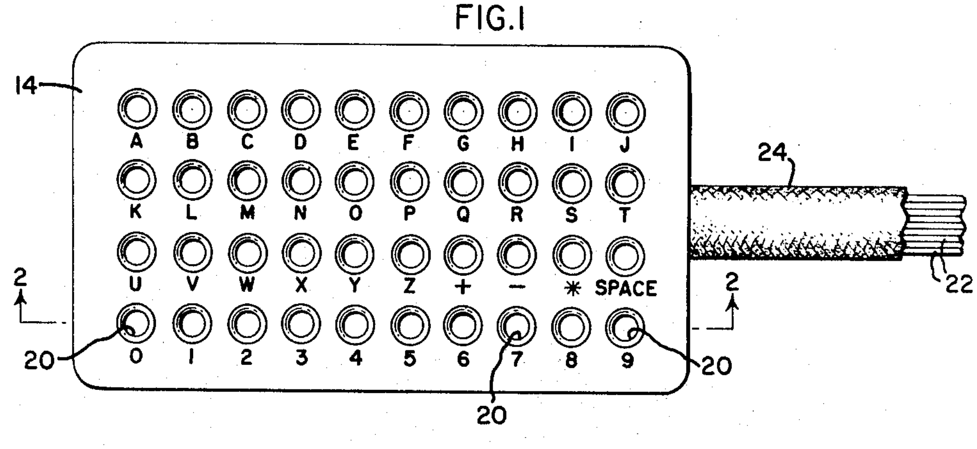
FIG. 1 shows a top plan view of one embodiment of a data input device in accordance with my invention.
Figure 2:
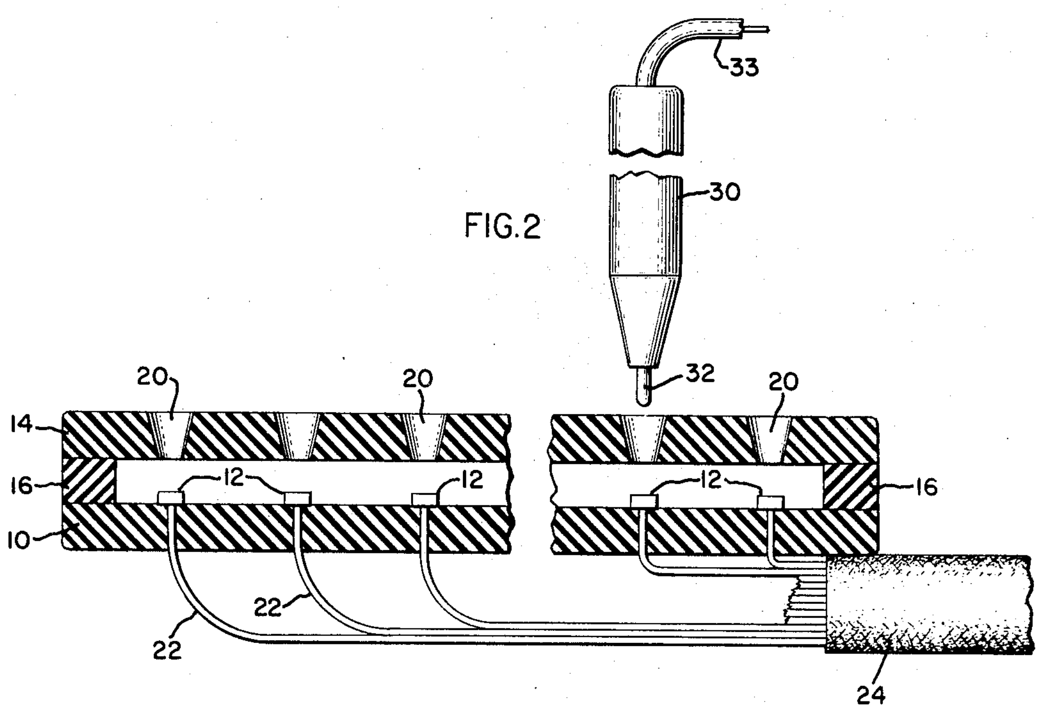
FIG. 2 shows an enlarged, cross-sectional view of my data input device taken along the line 2—2 in FIG. 1.

With reference to FIGS. 1 and 2, I have shown a top plan view and an enlarged cross-sectional view of one preferred embodiment of a data input device in accordance with my invention. My device comprises a base plate 10 having a flat upper surface and made of suitable electrically insulating material, such as phenolic. The base plate 10 is relatively thin and has a length and width that can accommodate the desired number of electrical contacts 12. However, I prefer that the base plate 10 be sufficiently small so that it can be easily held in a person's hand. A face plate 14, also formed of suitable electrically insulating material such as Lexan (the trademark for a material manufactured by General Electric Company) is positioned above and in registry with the base plate 10. The face plate 14 may be supported by spacers 16 which preferably extend around all four sides of the plates 10, 14, so as to completely enclose the contacts 12. The face plate 14 is provided with a plurality of tapered openings 20, each of which corresponds with and is directly above a respective one of the contacts 12. Input code designations are provided for each of the openings 20. While any number of openings 20 and contacts 12 may be provided, depending upon the requirements for the data input device, I have shown four rows with ten openings 20 and ten contacts 12 in each row so as to accommodate, by way of example only, the 26 letters of the alphabet, 10 numerals, and 4 extra or additional codes representing any desired information. Each of the contacts 12 comprises a suitable metallic element or disc having an imperforate surface which may be mounted on the base plate 10 in any desired fashion, such as by cement or mechanical fasteners. Or, the contacts may be provided by printed circuit techniques. Each of the contacts 12 is connected to a respective wire 22, which is insulated and placed in a suitable cable 24. I prefer that the wires 22 be braided or have a suitable construction that provides the maximum flexibility. The wires 22 are connected through the cable 24 to a suitable encoder which is operated or activated by an appropriate electrical condition in the wires 22. Encoders are known in the art, one example of such an encoder being encoder Model No. 51RW2, currently manufactured by the Microswitch Division of Honeywell Company at Freeport, Ill.

A hand-held stylus or probe 30 of suitable shape and size, such as a pencil for example, is provided for insertion through the openings 20. In the embodiment shown, the stylus 30 comprises an insulated handle having a metallic contact or point 32 connected to a suitable wire 33. The wire 33 may be connected to a source of potential or a ground, so that when the contact 32 engages the imperforate surface of one of the contacts 12, a suitable or an appropriate electrical circuit is closed through the wire 33, the contact 32, the contact 12, and the respective wire 22 which is connected to the encoder. This energizes some element of the encoder to cause the encoder to produce an appropriate signal. For example, if the probe 30 is inserted in the hole 20 corresponding to the letter T, an electrical circuit is closed so that the encoder produces the signal corresponding to the letter T. This signal can be transmitted over a wire line or radio link to a receiver which responds and produces the latter T on a suitable device.

Figure 3:
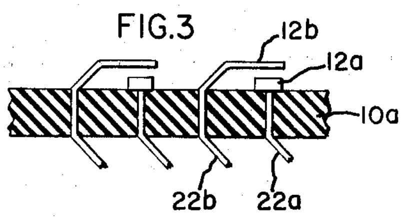
FIG. 3 shows a cross-sectional view showing another embodiment of contacts which can be used in my data input device.

FIG. 3 shows another embodiment of a data input device in accordance with my invention where the fixed contacts 12 of FIG. 2 have been replaced by operable or movable contacts, each of which has a fixed portion **12*a* mounted on a base plate 10*a* and connected to a wire 22*a*, and a movable portion 12*b* mounted on the base plate 10*a* above the fixed portion 12*a* and connected to a wire 22*b*. When a probe (not shown) is passed through an opening in the face plate (not shown) positioned above the movable portion 12*b* of a contact, a stylus can be used to push the movable portion 12*b* down and into engagement with the fixed portion 12*a*, and thus closes an electrical circuit between the wires 22*a*, 22*b*. This closure can operate an encoder in an appropriate fashion to provide a signal as described in connection with FIGS. 1 and 2. However, the embodiment of FIG. 3 does not necessarily have a common electrical portion (such as the wire 33 and the contact 32**), so that each electrical circuit may be isolated.

It will thus be seen that my invention provides a new and improved data input device which is relatively small, relatively light in weight, and portable. My data input device is particularly useful in mobile applications, such as the police patrol cars mentioned, where it may be necessary to send data, but where a large-size keyboard or other comparable device may not be desirable or feasible. While I have shown only two embodiments of my data input device, persons skilled in the art will appreciate that modifications may be made. For example, the base plate and face plate may be made of various materials, different opening tapers may be provided, and various opening configurations depending upon the number of codes required may be utilized. In addition, other types of contact or switching devices may be provided. For example, each of the contacts 12 of FIG. 2 may be replaced by a photoelectric device which, when illuminated, closes an electrical circuit. In such a case, the stylus 30 would be provided with a small reflective surface or light which, when it illuminates a photoelectric device, causes an electrical circuit to close or operate. An illuminating stylus would be helpful in locating the openings under dark conditions. Or, input data may be indicated by each contact being replaced by an electrostatic or electromagnetic field which, when disturbed by the stylus, causes an electrical change and hence an indication. And while I prefer that the contacts be similar, different types of contacts may be provided in a single data input device. Therefore, while my invention has been described with reference to particular embodiments, it is to be understood that modifications may be made without departing from the spirit of my invention, or from the scope of the claims

What I claim as new and desire to secure by Letters Patent of the United States is:

1. An improved personal data input device for connection to an encoding device to sequentially generate a series of coded signals, said data input device comprising;

a. a base plate of electrically insulated material having a relatively flat upper surface;

b. a plurality of electrical contacts, each of said contacts having an imperforate surface, and fixedly mounted on said base plate; said electrical contacts being spaced and electrically isolated from each other and arranged in a preselected pattern;

c. a separate conductive lead wire connected to each of preselected ones of said fixed electrical contacts;

d. a face plate of electrically insulating material mounted on said base plate above said upper surface thereof and adjacent said fixed electrical contacts;

e. said face plate having a plurality of openings therethrough, there being one opening respectively positioned relative to each fixed electrical contact to permit access to each of said fixed electrical contacts through its respective opening;

f. a probe comprising a metallic contact and an insulating handle, said metallic contact being connected to a wire extending through a portion of said handle;

g. a circuit being closed between a preselected one of said conductive lead wires and said wire extending through a portion of said handle upon said metallic contact of said probe being brought into engagement with the imperforate surface of a preselected one of said electrical contacts fixedly mounted on said base plate.

* * * * *